Figure 1:
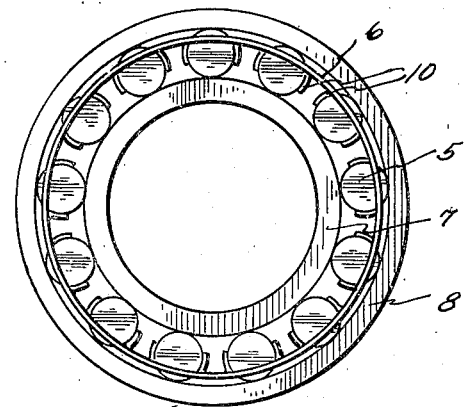

Aug. 31, 1926.

D. STEVENS

ROLLOR BEARING CAGE

Filed March 15, 1924

1,598,025

INVENTOR.
Daniel Stevens
BY John C. Alexander
ATTORNEY.

Patented Aug. 31, 1926.

1,598,025

UNITED STATES PATENT OFFICE.

DANIEL STEVENS, OF DETROIT, MICHIGAN.

ROLLER-BEARING CAGE.

Application filed March 15, 1924. Serial No. 699,495.

This invention relates to roller bearing cages, and has for its primary object the provision of a one-piece cage that will retain in position cylindrical rollers without requiring any locking rib or other retaining means as is customary with the cylindrical and tapered roller bearing now on the market.

Another object of my invention is the provision of a simple and comparatively inexpensive roller bearing cage that can be quickly manufactured out of material of varying thicknesses, and which is durable and lasting in actual use.

A further object of my invention is the provision of a process of manufacturing one-piece straight roller bearing cages in which a strip of plane steel is first slotted, then tabs are bent downwardly from adjacent each end of the slots, and then the steel is curved into the form of a tube and the ends welded together, the tabs being so positioned that when the cage is in its tubular form the tabs will bear on each side of the roller bearings at points below the center line of the roller bearings.

Other objects and advantages will be apparent from the following description, wherein reference is made to the accompanying drawings illustrating a preferred embodiment of my invention and wherein similar reference numerals designate similar parts throughout the several views.

In the drawings:

Fig. 1 is an end elevation of a roller bearing cage with cylindrical rollers in engagement with inner and outer sleeves.

Figure 2:
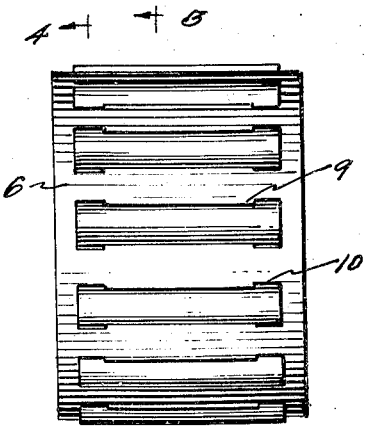

Fig. 2 is a side elevation of the cage with rollers in position therein.

Figure 3:
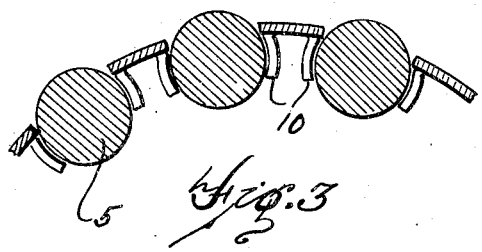
Figure 4:
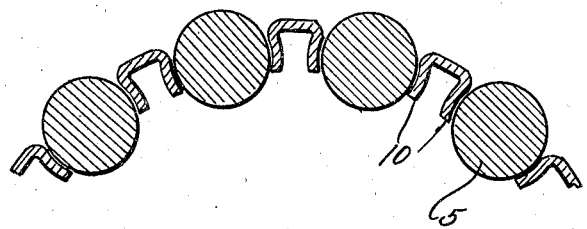

Fig. 3 is a detail section taken substantially on the line 3—3 of Fig. 2, and Fig. 4 is a similar section taken substantially on the line 4—4 of Fig. 2.

Referring now to the drawings, the numeral 5 designates a series of rollers adapted to be maintained in circumferential alignment by means of the cage 6, whereby they will provide a rolling contact for an inner sleeve 7 or outer sleeve 8, or both, or a housing or spindle according to the use desired.

The bearing cage 6 comprises a one-piece tube of slightly greater diameter than the roll circle of the rollers—i. e., the diameter of the circle formed by the centers of the rollers when the rollers are in their proper relative positions. The length of the tube is slightly greater than the length of the rollers, and the periphery of the tube is slotted centrally of its length with equally spaced slots 9, the width of the slots being slightly less than the diameter of the rollers. In this way a portion of the rollers 5 may project beyond the outer periphery of the cage 6 to present bearing surfaces for engagement with an outer sleeve or housing 8, but the rollers themselves cannot emerge through the slots 9 because of the greater diameter of the rollers. Moreover when the rollers project through the slots 9 the uncut end portions of the tube provide means for preventing the lengthwise movement of the rollers when in use. To regulate this the slots are formed with but slightly greater length than the length of the rollers 5.

To maintain the rollers in the desired position of use—i. e. with a portion of the rollers projecting beyond the periphery of the tube 6—short tabs 10 are split from the material of the tube adjacent the ends of each slot and bent inwardly to form prongs that will engage the rollers adjacent its ends in a plane slightly beyond the center of the roller, and thus prevent the roller from slipping or falling toward the axis of the tube. By reason of this arrangement, it will be apparent that the rollers 5 are prevented from moving radially outwardly because of the side walls of the slots 9 and are prevented from moving radially inwardly by their engagement with the tabs 10 curved inwardly from adjacent the ends of the slots 9. In addition the rollers are held from longitudinal movement by the uncut ends of the tube 6.

The process of making my improved cages preferably consists of stamping the cages from light gauge plane steel sheets. Such material is resilient, and the curved tabs 10 will possess an inherent resiliency that will enable their being pressed apart to permit the insertion of the rollers into position without deformation of the cage. The plane sheets are first slotted and blanked to the desired size, then the tabs are split from the material of the sheet adjacent the ends of the slots and curved downwardly to the desired extent, and then the sheet is curved to form a tube with the tabs extending radially inwardly therefrom. The ends of the plane sheet may be made to abut, and be welded in such abutting position, or other means may be employed for securing the ends of the sheet to retain the cage in tubular form.

The cages 6 may be readily stamped in various lengths and diameters, and the tabs 10 curved to retain rollers of different sizes.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claim.

Having described my invention, I claim—

A one-piece straight roller bearing cage consisting of a tube having circumferentially spaced slots cut therein of slightly greater length than the length of the rollers and with their central portions of a width slightly less than the diameter of the roller, the material adjacent the slots at both ends of the diminished central portions being curved inwardly to form retaining tabs adapted to engage the rollers inwardly of their axes.

In witness whereof I hereunto set my hand.

DANIEL STEVENS.